(12) United States Patent
Sawada et al.

(10) Patent No.: US 6,425,175 B1
(45) Date of Patent: Jul. 30, 2002

(54) METHOD OF MANUFACTURING A STATOR

(75) Inventors: Yukinori Sawada, Handa; Makoto Takahashi; Masaru Sugiyama, both of Okazaki; Kazuki Maesoba; Masayuki Asai, both of Anjo, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/542,022

(22) Filed: Mar. 31, 2000

(30) Foreign Application Priority Data

Mar. 31, 1999 (JP) ............................................. 11-094246
Jan. 25, 2000 (JP) ........................................ 2000-016202

(51) Int. Cl.$^7$ ........................ H02K 15/00; H02K 15/14; H02K 15/16
(52) U.S. Cl. ........................ 29/596; 29/564.1; 29/605; 29/606; 310/179; 310/184; 310/198; 310/204
(58) Field of Search ............................... 29/564.1, 596, 29/605, 606; 310/179, 184, 198, 204

(56) References Cited

U.S. PATENT DOCUMENTS

| | | | |
|---|---|---|---|
| 1,822,261 A | 9/1931 | Apple | 310/201 |
| 2,407,935 A | 9/1946 | Perfetti et al. | 310/201 |
| 2,928,963 A | 3/1960 | Bertsche et al. | 310/168 |
| 3,450,913 A | 6/1969 | Baker et al. | 310/159 |
| 3,453,468 A | 7/1969 | Lund | 310/180 |
| 4,238,702 A | 12/1980 | Belova et al. | 310/179 |
| 4,870,307 A | 9/1989 | Kitamura et al. | 310/54 |
| 5,093,591 A | 3/1992 | Kitamura et al. | 310/62 |
| 5,097,167 A | 3/1992 | Kanayama et al. | 310/201 |
| 5,122,705 A | 6/1992 | Kusase et al. | 310/68 |

(List continued on next page.)

FOREIGN PATENT DOCUMENTS

| | | |
|---|---|---|
| DE | 3704780 | 11/1988 |
| DE | 3901098 | 4/1990 |
| DE | 4301234 | 8/1993 |
| EP | 162 317 | 4/1985 |
| GB | 2263653 | 8/1993 |
| JP | 48-442 | 1/1973 |
| JP | 50-47102 | 4/1975 |
| JP | 56-98358 | 7/1981 |
| JP | 59-98358 | 8/1981 |
| JP | 59-159638 | 9/1984 |
| JP | 59-501691 | 10/1984 |
| JP | 61-221561 | 10/1986 |
| JP | 62-272836 | 11/1987 |
| JP | 63-257435 | 10/1988 |
| JP | 63-274335 | 11/1988 |
| JP | 64-5340 | 1/1989 |

(List continued on next page.)

OTHER PUBLICATIONS

Masami, "AC Generator for Vehicle", Patent Abstracts of Japan, Publication No. 3–27748, Feb. 6, 1991.
Kazuhiko, "Motor Having Stator Winding", Patent Abstracts of Japan, Publication No. 9–19096, Jan. 17, 1997.
Toronron, "Thrust Bearing", Patent Abstracts of Japan, Publication No. 9–117095, May 2, 1997.

*Primary Examiner*—Peter Vo
*Assistant Examiner*—Paul Kim
(74) *Attorney, Agent, or Firm*—Harness, Dickey & Pierce, PLC

(57) ABSTRACT

In a twisting formation method having an inside jig provided in a ring shape with inside holding portions for folding one of the straight portions of a near letter U shaped wire and an outside jig provided in a shape of ring concentric with that of the inside holding portions with outside holding portions for folding the other of the straight portions, the connecting portion of the near letter U shaped wire being formed in a twisted shape by rotating relatively the inside and outside jigs, the method includes urging leading ends of the straight portions and the connecting portion in a contracting direction.

7 Claims, 8 Drawing Sheets

U.S. PATENT DOCUMENTS

| | | | |
|---|---|---|---|
| 5,191,257 A | 3/1993 | Sugiyama | 310/198 |
| 5,363,546 A | 11/1994 | Bradtmueller et al. | 29/564.1 |
| 5,522,125 A | 6/1996 | Bradtmueller et al. | 29/598 |
| 5,536,987 A | 7/1996 | Hayashi et al. | 310/263 |
| 5,574,324 A | 11/1996 | Hirama et al. | 310/194 |
| 5,691,590 A | 11/1997 | Kawai et al. | 310/180 |
| 5,708,316 A | 1/1998 | Ishida | 310/184 |
| 5,742,498 A | 4/1998 | Taniguchi | 363/145 |
| 5,778,512 A | 7/1998 | Ichikawa et al. | 29/829 |
| 5,845,389 A | 12/1998 | Roberts et al. | 29/596 |
| 5,936,326 A * | 8/1999 | Umeda | 310/179 |
| 5,965,965 A * | 10/1999 | Umeda | 310/52 |
| 5,982,068 A * | 11/1999 | Umeda | 310/206 |
| 5,986,375 A * | 11/1999 | Umeda | 310/180 |
| 5,998,903 A * | 12/1999 | Umeda | 310/179 |
| 6,091,169 A * | 7/2000 | Umeda | 310/62 |
| 6,181,044 B1 * | 1/2001 | Umeda | 310/201 |
| 6,198,190 B1 * | 3/2001 | Umeda | 310/179 |
| 6,249,956 B1 * | 6/2001 | Maeda | 29/596 |

FOREIGN PATENT DOCUMENTS

| | | |
|---|---|---|
| JP | 2-214440 | 8/1990 |
| JP | 3-159549 | 7/1991 |
| JP | 4-26345 | 1/1992 |
| JP | 6-22511 | 1/1994 |
| JP | 6-165422 | 6/1994 |
| JP | 7-303351 | 11/1995 |
| JP | 8-205441 | 8/1996 |
| JP | 8-298756 | 11/1996 |
| JP | 8-331818 | 12/1996 |
| JP | 9-56128 | 2/1997 |
| JP | 9-182337 | 7/1997 |
| WO | 84/01478 | 4/1984 |
| WO | 92/06527 | 4/1992 |

* cited by examiner

METHOD OF MANUFACTURING A STATOR

CROSS REFERENCE TO RELATED APPLICATIONS

This application is based upon and claims the benefit of priority of Japanese Patent Applications No. H.11-94246 filed on Mar. 31, 1999 and No. H. 12-16202 filed on Jan. 25, 2000, the contents of which are incorporated herein by reference.

BACKGROUND OF THE INVENTION

1. Field of the Invention

The present invention relates to a stator manufacturing method, in particular, a method for forming in a twisted shape a near letter U shaped wire or near letter U shaped double wires.

2. Description of Related Art

A stator of a large-scale starter to be installed in automobiles employs an electromagnetic coil having a large cross sectional area for flowing large electric current.

To manufacture the electromagnetic coil, at first, a wire made of conductive material such as copper is formed in a near letter U shaped wire 10. Next, a turning portion 12 of the near letter U shaped wire 10 is twisted so that a twisted wire 1 may be formed (refer to FIG. 7).

The twisted wires 1 are press fitted for assembly into slots of a yoke and, after assembly to the yoke, both ends thereof are further deformed and connected with each other by welding and so on to complete the electromagnetic coil.

A twisting formation apparatus 100 for mass-producing the twisted wire 1 is provided with, as shown in FIG. 10, an outside holding ring 45 and an inside holding ring 35 into which a pair of straight line portions 11, 11 of the near letter U shaped wire 10 are separately inserted and held respectively and which are arranged concentrically, and further provided with an inside jig 3 and an outside jig 4 which are relatively rotatable.

According to this conventional twisting formation apparatus 100, a twisting formation of the near letter U shaped wire 10 is conducted in such a manner that the respective straight line portions 11, 11 of a plurality of the near letter U shaped wires are inserted into the inside and outside holding rings 35 and 45, upper ends of all of the turning portions 12 are initially aligned or fixed by a retaining element 101, and, then, the turning portions 12 are twisted by a relative rotating movement of the inside and outside jigs 3 and 4.

However, in the twisting formation apparatus 100 mentioned above, when the retaining element 101 is operative for initial alignment of the upper ends of the turning portions, a gap A comes out in height direction since a pull is given to the turning portion 12 by a deformation of the near letter U shaped wire 10. On the other hand, when the retaining element fixes the upper end of the turning portion 12, the straight line portions 11,11 are moved upward as the turning portion is pulled up during the formation of the near letter U shaped wire 10. Thus, there exists a state that the near letter U shaped wire 10 is not supported in an up and down direction or is fixed by one point during the deformation process, resulting in a problem that the twisted shape formation of the turning portion is not likely to be uniform.

SUMMARY OF THE INVENTION

The present invention has been made in view of the above mentioned problem, and an object of the present invention is to provide a twisting formation apparatus in which a plurality of the near letter U shaped twisted wires or near letter U shaped twisted double wires are formed in a uniform shape at a time.

The twisting formation apparatus enables to form at a time in a uniform twisted shape a plurality of the near letter U shaped wires, in such a manner that at least either the turning portion or respective leading ends of the straight line portions are urged toward the straight line portions by biasing means.

Therefore, not only the twisted wires may be formed in a uniform shape, but also a generator or a motor such as a starter necessitating a large amount of the near letter U shaped wires may be manufactured with a minimum cost. In the apparatus, plural kinds of near letter U shaped double wires piled up with each other may be formed in a uniform twisted form.

According to the stator manufacturing apparatus for wires in pile, while the biasing means urges the turning portion of the wire arranged most outside, the first and second supporting portions support the respective leading ends of pair of straight line portions of the wire arranged most outside at predetermined positions in respective axial directions of pair of straight line portions.

Thus, each of pair of straight line portions is prevented from being relatively moved in an axial direction of each of the straight line portions from the first or second holding jig.

Further, the near letter U shaped wires partly project out of the first and second holding jigs. The respective wires projecting on the turning portion side have lengths to an extent that, when the first and second holding jigs are relatively moved, only the respective projecting turning portions are deformed and, thus, the respective straight line portions held in the first and second holding jigs are not drawn out toward the turning portions.

Therefore, the first and second supporting portions serve to prevent damages of the near letter U shaped wires due to frictions between the respective straight line portions and the respective holding jigs.

The near letter U shaped wires in pile are respectively provided with the turning portions having different curvature radiuses. Therefore, a starting portion where the wire arranged inside (inside wire) is deformed is more far away from a center of the turning portion than a starting portion where the wire arranged outside (outside wire) is deformed. As a result, after the twisting formation process, a height length of the inside wire becomes shorter than that of the outside wire.

Therefore, as another aspect of the present invention, the stator manufacturing apparatus is provided with the second biasing mechanism for urging the leading ends of the straight line portions of the inside wire. Thus, when the turning portion of the inside wire is twisted, an upper surface of the turning portion of the inside wire is maintained to press against a lower surface of the turning portion of the outside wire, even if the length of the inside wire becomes shorter.

As a result, a twisted shape fluctuation of the turning portion (turning portion 63) of the inside wire may be prevented, as the inside wire is twisted also at a state that a movement in an axial direction thereof is restricted.

As a further aspect of the present invention, the stator manufacturing apparatus is provided with the third biasing mechanism for urging respective leading ends of the straight line portions of the outside wire toward respective directions of the straight line portions, after the turning portions of the plural kinds of near letter U shaped wires arranged in piles have been twisted.

As a result, the respective leading end positions of the outside wire are accurately aligned by the third biasing mechanism for deforming the outside wire, even if the respective leading end positions are fluctuated to some extent during the previous process, so as to absorb such a fluctuation.

As a furthermore aspect of the present invention, the first holding portion is formed in a ring shape and the second holding portion is also formed in a ring shape on an outer circumference side of and concentrically with the first holding portion. Therefore, a relative rotating movement of the first and second holding jigs cause to twist the turning portions of the near letter U shaped wire or double wires. The twisted wires formed as above mentioned are, then, inserted into slots of a stator core. The insertion into the slots becomes easy because the stator core is formed generally in a ring shape.

Another object of the present invention is to provide manufacturing methods as processes executed by the stator manufacturing apparatus mentioned above.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

Figure 1:
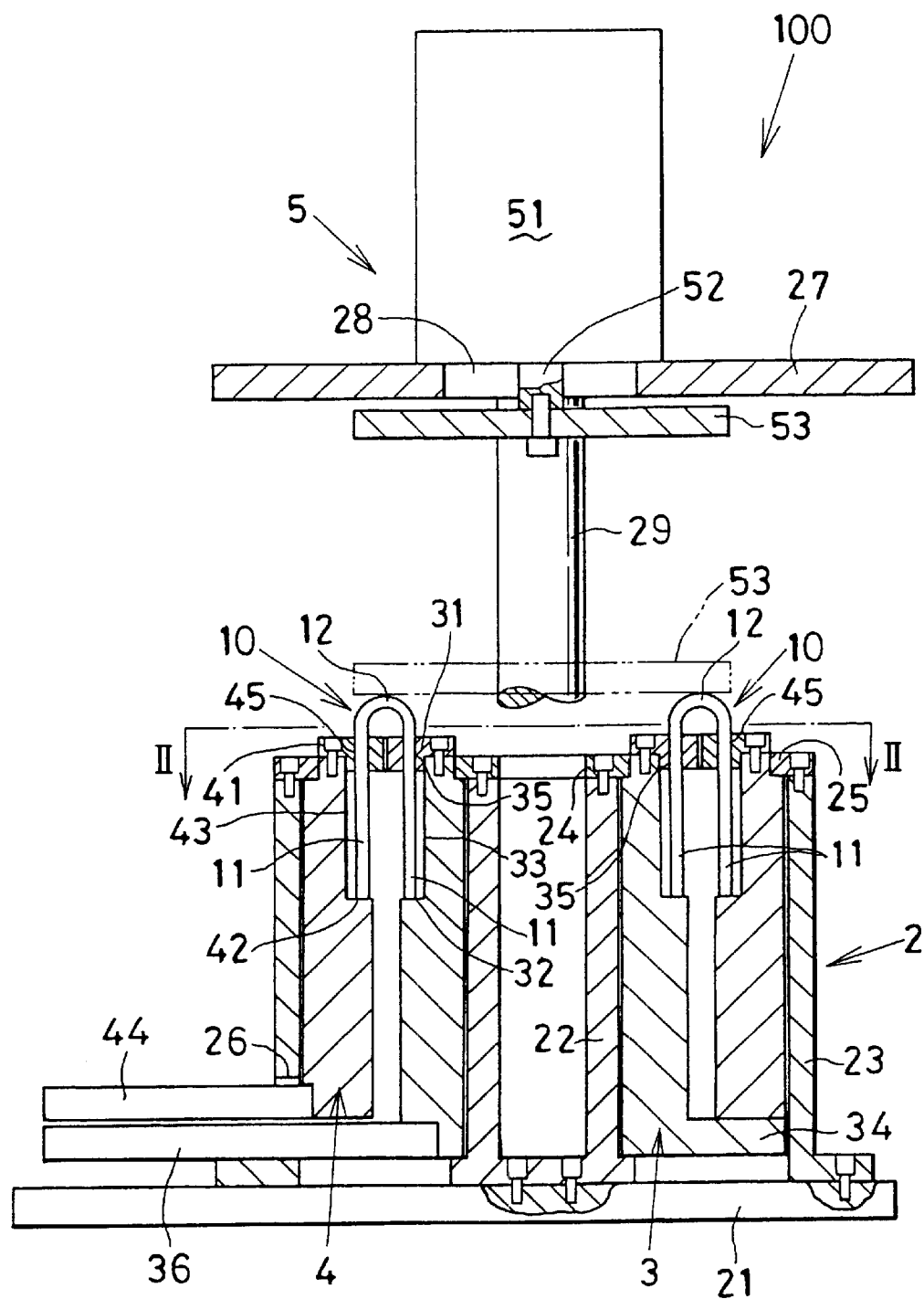
FIG. 1 is a cross sectional front view of an apparatus for forming in a twisted shape near letter U shaped wires according to a first embodiment of the present invention.
Figure 2:
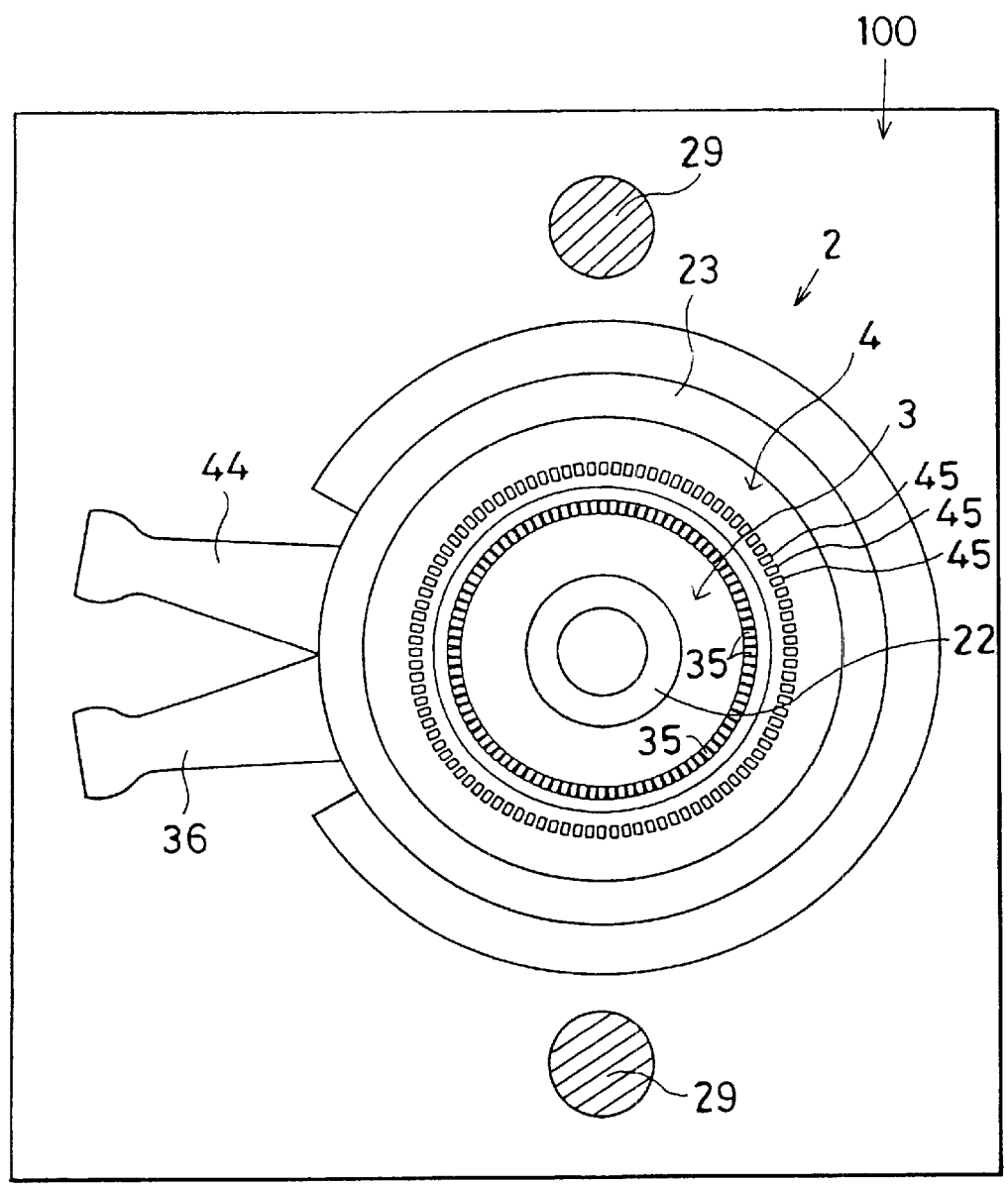
FIG. 2 is a cross sectional plan view taken along a line II—II of FIG. 1.
Figure 3:
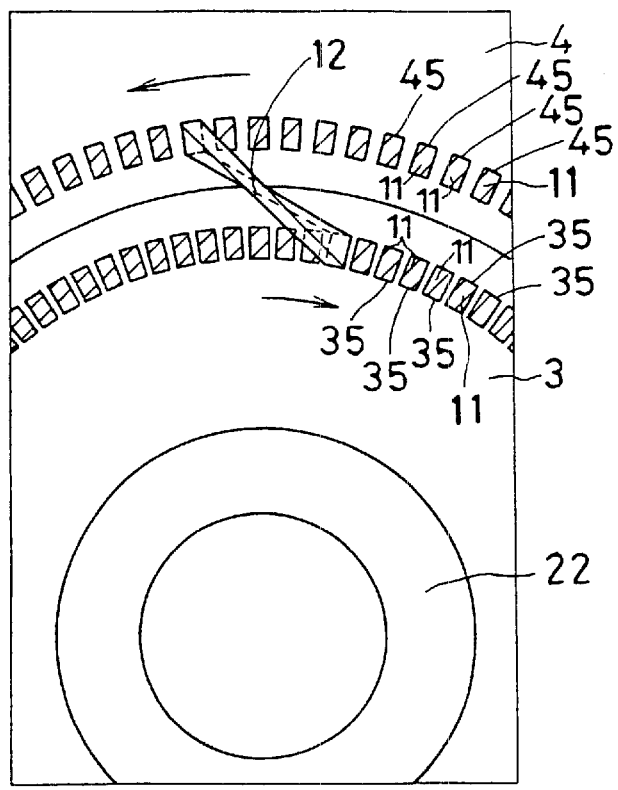
FIG. 3 is an enlarged view of a part of FIG. 2.

FIGS. 1 to 3 show a twisting formation apparatus 100 for forming a near letter U shaped wire in a twisted shape as a stator manufacturing apparatus according to a first embodiment of the present invention.

Figure 7:
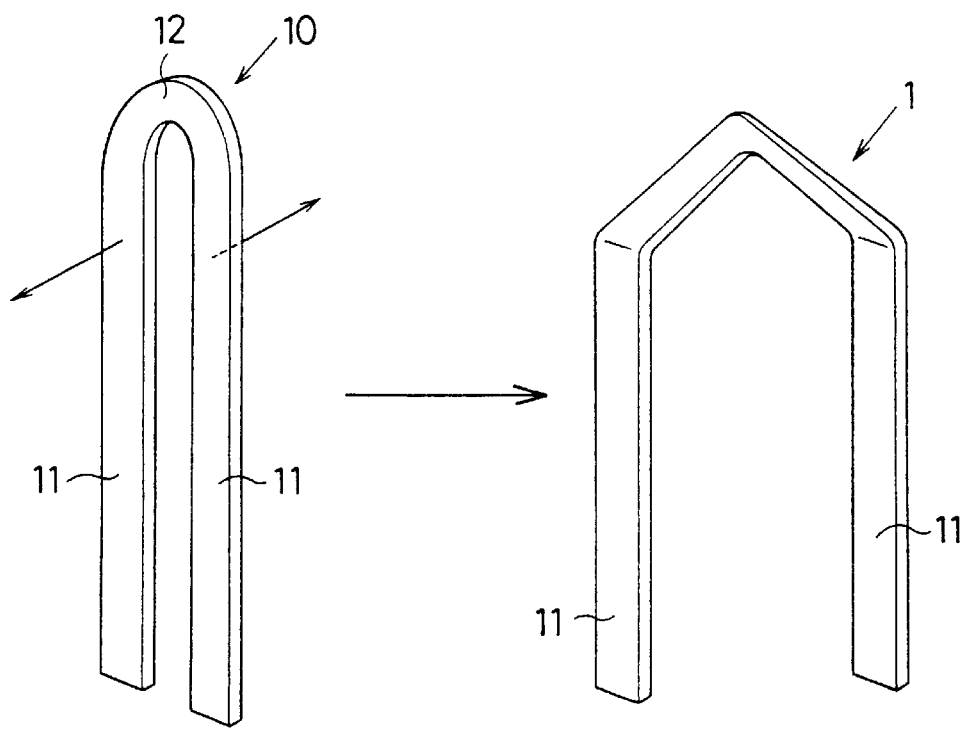
FIG. 7 is perspective views of a near letter U shaped wire and a twisted wire.

The twisting formation apparatus 100 is for forming a near letter U shaped wire 10 in a twisted shape as shown in FIG. 7 and manufactures at a time a large amount of the twisted wires 1 as electromagnetic coil elements to be used in a stator for a starter and so on.

According to the first embodiment, the near letter U shaped wire 10 is made by forming in a near letter U shape a predetermined length of a rectangular cross sectional shaped conductive wire coated by insulating material and composed of straight line portions 11, 11 and an arc shaped connecting portion 12 (turning portion).

The near letter U shaped wire 10 may be a circular or other cross sectional shaped wire and the connecting portion 12 may be formed in, beside the arc shape, a near letter V shape or a near trapezoidal shape.

The apparatus 100 for forming in a twisted shape the near letter U shaped wires is provided with a casing 2 composed of a base plate 21, and a cylindrical shaped center axis tube 22 and an external tube 23 both of which have a common center axis and are concentrically fixed to the base plate 21. An inside retaining ring 24 and an outside retaining ring 25 are fastened respectively to upper ends of the center axis and external tubes 22 and 23. An arm-inserting window 26 is provided at a lower end of the external tube 23.

A cylindrical shaped inside jig 3 (first holding jig) is slidably fitted to an outside of the center axis tube 22. A cylindrical shaped outside jig 4 (second holding jig) is located outside the inside jig 3 and is slidably fitted to an inside of the external tube 23. An upper end internal circumference of the inside jig 3 is slidably retained by the inside retaining ring 24 and an upper end external circumference of the outside jig 4 is slidably retained by the outside retaining ring 25.

An inside holding ring 31 is attached to an upper end surface of the inside jig 3. The inside jig 3 is provided at an upper external circumference thereof with a diameter-reduced portion 33 having an external circumferential step 32 and at a lower end thereof with a flange portion 34. The inside holding ring 31 is provided with an inside holding portion 35 constituted by rectangular shaped holes arranged in a ring shape, in which one of the straight line portions 11, 11 of the near letter U shaped wire is inserted. An external circumference of the flange portion 34 abuts an internal circumference surface of the external tube 23. A lower side arm 36 extending in a radial direction through the arm-inserting window 26 is connected to an external circumference portion of the flange 34.

A lower end surface of the outside jig 4 is slidably placed on the flange portion 34 and the outside holding ring 41 is fastened to an upper end surface of the outside jig 34. The outside jig 34 is provided at an upper internal circumference thereof with a diameter-enlarged portion 43 having an internal circumference step 42.

An upper side arm 44 extending through the arm-inserting window 26 is connected to a lower end of the outside jig 4. The outside holding ring 41 is provided with an outside holding portion 45 constituted by rectangular shaped holes arranged on a circle, in which the other of the straight line portions 11, 11 of the near letter U shaped wire is inserted. The outside holding portion 45 is faced to and arranged concentrically with the inside holding portion 35.

A pair of pillars 29, 29 are provided in the base plate 21 in such a manner that the external tube 23 is put between the pair of pillars 29, 29. An upper base plate 27 is fixed horizontally to upper ends of the pillars 29, 29. The upper base plate 27 is provided with a round hole 28 concentrically with the center axis tube 22 and a biasing mechanism 5 urging the near letter U shaped wires 10 with a contraction force.

The biasing mechanism according to the present embodiment is composed of an expanding and contracting actuator 51, a moving arm 52 driven to move up and down by the actuator 51 and a biasing disk plate 53 fastened at a lower end of the moving arm 52. The arm 52 is disposed through the round hole 28. The biasing disk plate 53 has a size sufficient to come in contact with all of the connecting portions 12 of the near letter U shaped wires 10.

The expanding and contracting actuator 51 may be an actuator causing a reciprocal up and down movement of the arm 52 by means of a cylinder and a hydraulically or aerodynamically-operated piston, or by means of a combination of a motor and a ball screw. The biasing mechanism 5 may be of a type that a weight of the biasing disk plate 53 is utilized.

Next, an operation method of the twisting formation apparatus 100 is described.

The respective straight line portions 11, 11 of the near letter U shaped wires 10 are inserted into all of the respective rectangular holes of the inside and outside holding portions 35 and 45. The leading ends of the straight line portions 11, 11 come in contact with the external and internal circumference steps 32 and 42, respectively.

Then, the arm 52 is moved downwardly so that the biasing disk plate 53 may be moved down, as shown by a two dots-slash line in FIG. 1, to urge all of the connecting portions 12 of the near letter U shaped wires 10 downwardly in the drawing. As a result, certain contraction forces generates in the entire near letter U shaped wires 10 between the external and internal circumference steps 32 and 42 and the biasing disk plate 53.

Next, as shown in FIG. 3, the lower and upper side arms 36 and 44 are rotated by identical angles in opposite directions by a rotating device not shown in the drawing. During this process, the connecting portions 12 of the near letter u shaped wires 10 are fixed to the biasing disk plate 53 due to the contraction force urged by the biasing disk plate 53. Therefore, each of the connecting portions 12 is formed in a twisted shape by rotating the lower and upper side arms 36 and 44 by identical angles in opposite directions respectively in such a manner that both sides of the connecting portion 12 are uniformly deformed centered on a top of the connecting portion 12.

As a plurality of the near letter U shaped wires 10 are installed in the inside and outside jigs 3 and 4, all of the near letter U shaped wires 10 are formed in twisted shapes at a time when the inside and outside jigs 3 and 4 are relatively rotated. That is, a large amount (for example 96 pieces) of the twisted wires 1 as shown in FIG. 7 are manufactured at a time.

During the twisting formation process mentioned above, the expanding and contracting actuator 51 urges downward with a certain biasing force (torque) the connecting portions 12 via the biasing disk plate 53. Thus, the contraction force is always applied between the connecting portion 12 and the respective leading ends of the straight line portions 11, 11. The contraction force thus applied serves to surely prevent the fluctuation of the twisted shape of the connecting portion 12. In other words, when the connecting portion 12 of the near letter U shaped wire 10 is formed in the twisted shape, the height position of the connecting portion 12 becomes lower, as a space between the straight line portions 11, 11 is expanded more largely. At this time, if the near letter U shaped wire 10 is movable in an axial direction, the respective holding positions of the straight line portions at the inside and outside jigs 3 and 4 fluctuate. As a result, the twisted shape of the connecting portion 12 fluctuates.

According to the first embodiment, the biasing disk plate 53 is so movable up and down that, as the height position of the connecting portion 12 becomes lower, the biasing disk plate 53 moves downward to follow the connecting portion 12 and continues to urge the connecting portion 12 with a certain biasing force. Thus, the connecting portion 12 is formed in the twisted shape in such a manner that the inside and outside jigs hold the straight line portions 11, 11 of the near letter U shape[0084] wire 10 always at respective predetermined positions. Therefore, the fluctuation of the twisted shape of the connecting portion 12 may be prevented.

Further, after the twisted wires 1 are inserted into the slots of the stator core, the leading ends of the straight portions 11, 11 are further formed to bend and, then, each of the leading ends of one of the twisted wires 1 is connected to each of the leading ends of another of the twisted wires 1 to complete the stator coil. In this case, as the respective leading end positions of the straight line portions 11, 11 are aligned due to the contraction force applied by and between the biasing disk plate 53 and the external and internal circumference steps 32 and 42, as shown in the present embodiment, it is not necessary to align the respective positions of the leading ends of twisted wires 1, separately, when the respective leading ends are connected to each other. This will result in an easy manufacturing process for connecting the wires.

Furthermore, the twisted wires 1 are assembled to the slots of the stator core arranged in a ring shape around the rotor. As the holding portions (the inside holding portion 35 and the outside holding portion 45) for holding the straight line portions 11, 11 of the near letter U shaped wires 10 are arranged on respective concentric circles, the assembly of the twisted wires 1 to the. slots, as a next process to the twisting formation process, becomes easy.

Figure 6:
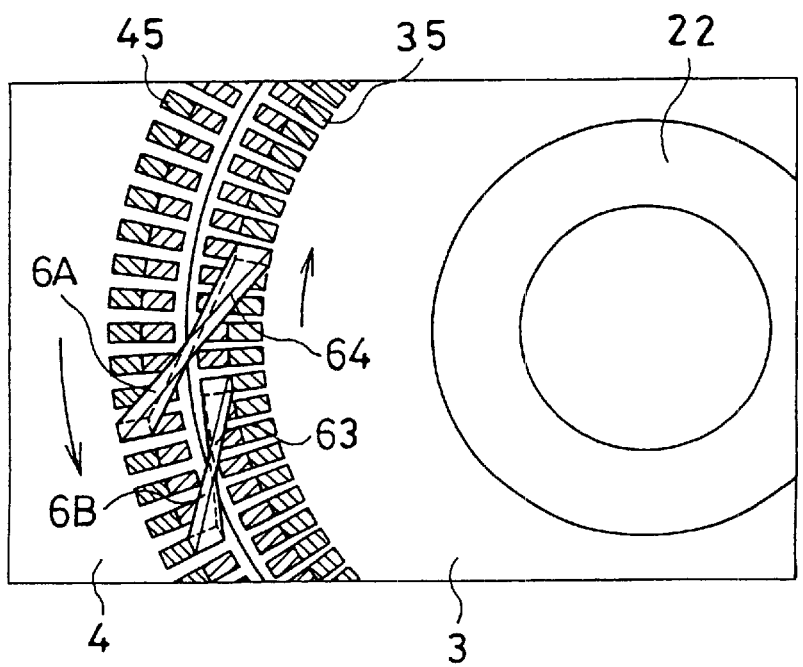
FIG. 6 is an enlarged view of a part of FIG. 5.
Figure 4:
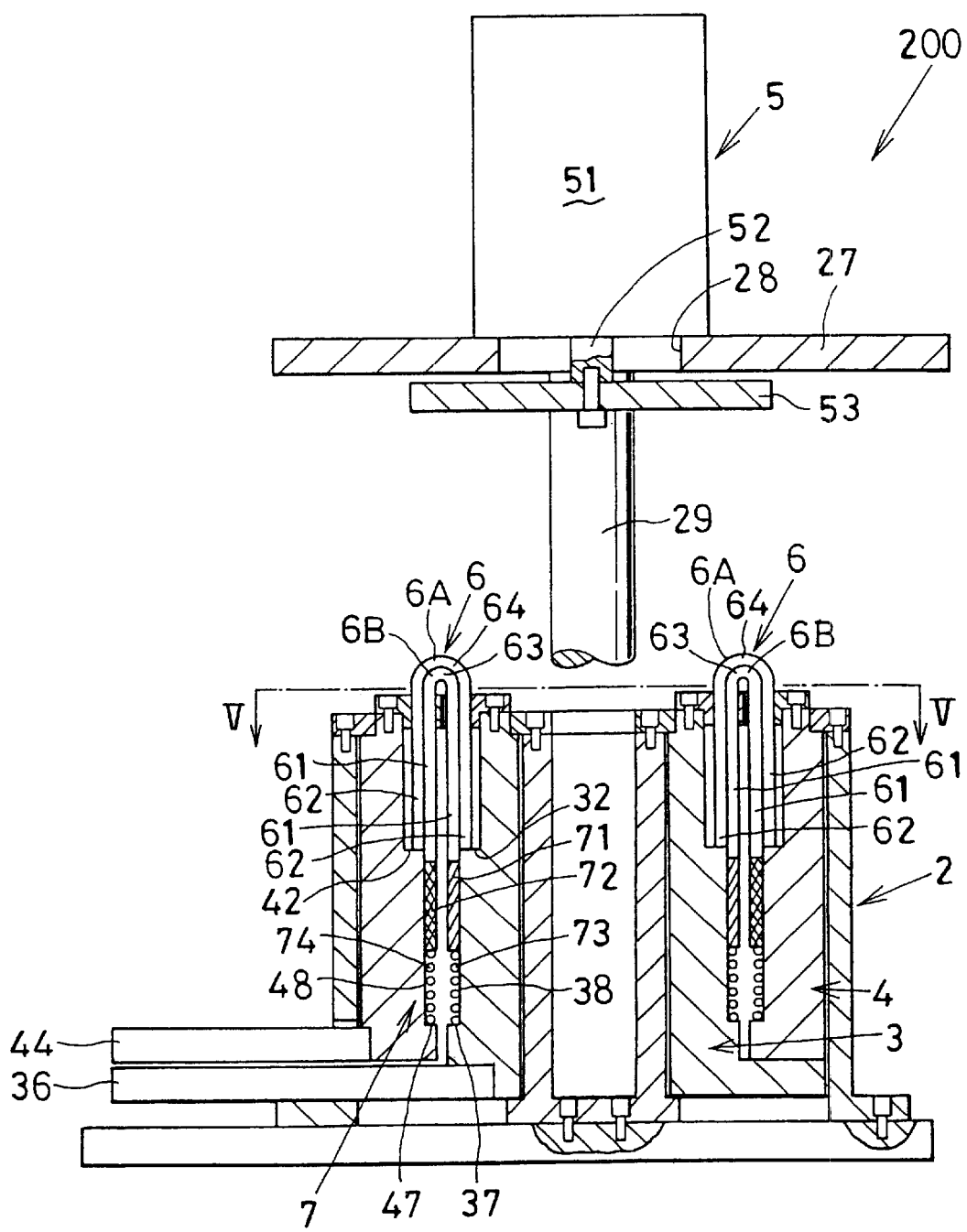
FIG. 4 is a cross sectional front view of a wire twisting formation apparatus according to a second embodiment of the present invention.
Figure 5:
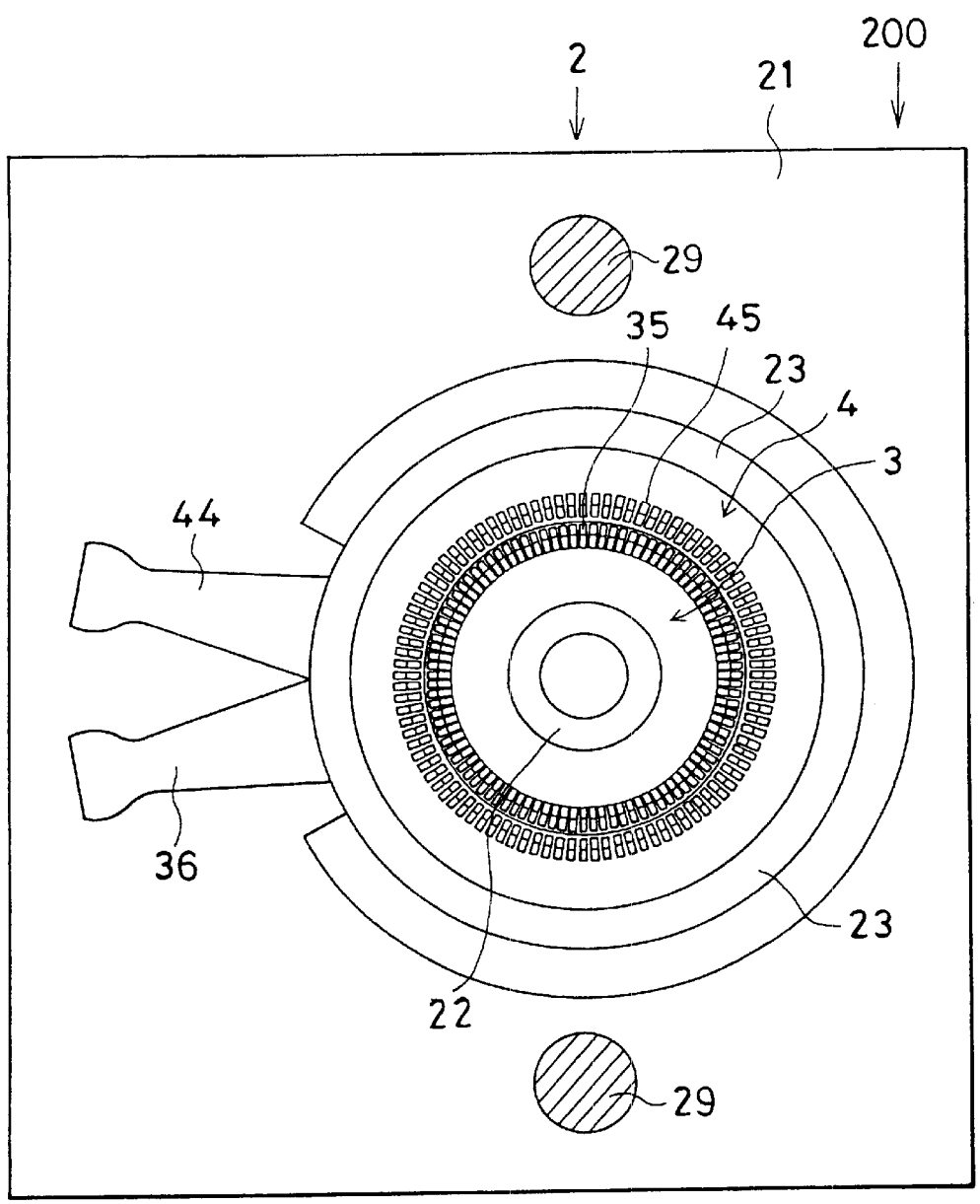
FIG. 5 is a cross sectional plan view taken along a line V—V of FIG. 4.
Figure 8:
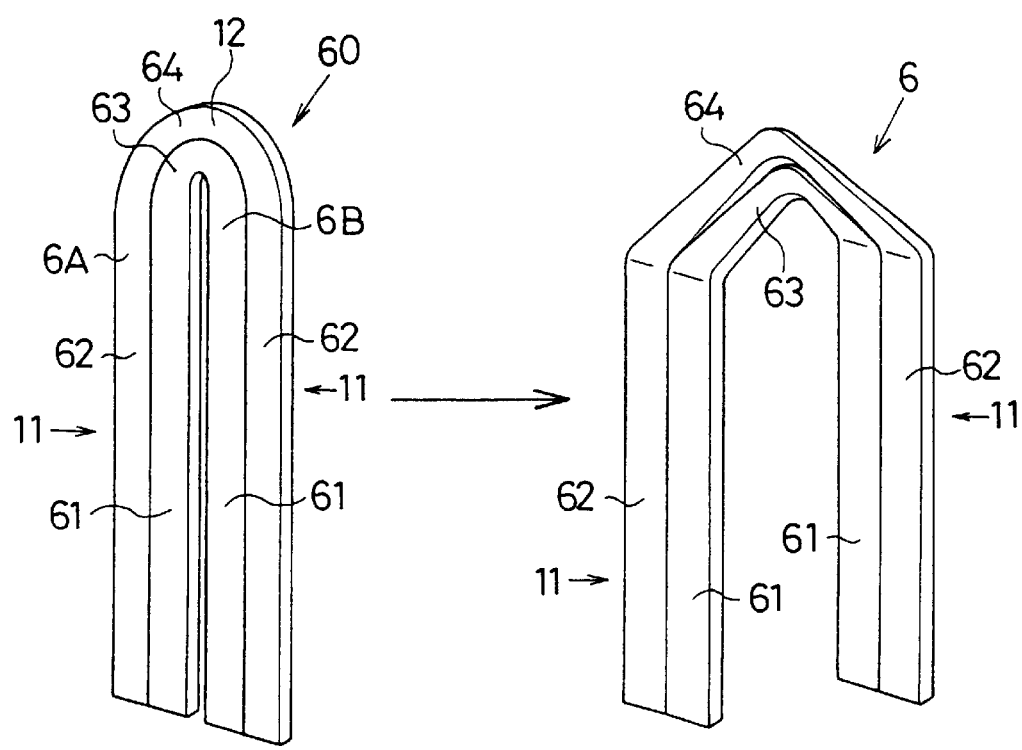
FIG. 8 is perspective views of near letter U shaped double wires and twisted double wires.

FIGS. 4 to 6 shows a second embodiment. A wire twisting apparatus 200 as another stator manufacturing apparatus according to the second embodiment is for manufacturing twisted double wires 6 by forming at a time in twisted shapes near letter U shaped two wires comprising an outside wire 6A and an inside wire 6B piled up outside and inside, as shown in FIG. 8.

According to the second embodiment, the inside and outside jigs 3 and 4 are provided respectively with middle outside diameter and middle inside diameter portions 38 and 48 having lower external and lower internal circumference steps 37 and 47 at respective downsides of the external and internal circumference steps 32 and 42.

At the middle outside and middle inside diameter portions 38 and 48, disposed are spring type biasing means 7 for urging the straight line portions 61, 61 of the inside wire 6B toward the connecting portion 63.

The spring type biasing means is composed of movable external and internal tubes 71 and 72 fitted movably in an up and down direction to the middle outside and inside diameter portions 38 and 48, respectively, and coil springs 73 and 74 disposed between lower ends of the movable external and internal tubes 71 and 72 and the lower external and lower internal circumference steps 37 and 47, respectively.

The rectangular shaped holes of the inside and outside holding portions 35 and 45 correspond in size to cross sectional shapes of the straight line portions 11, 11 of the near letter U shaped double wires 60. When the straight line portions 11, 11 of the near letter U shaped double wires 60 are inserted into the inside and outside holding portions 35 and 45, respectively, the leading ends of the straight portions 62, 62 of the outside wire 6A come in contact with the external and internal circumference steps 32 and 42 and the leading ends of the straight portions 61, 61 of the inside wire 6B come in contact with the movable external and internal tubes 71 and 72.

At the state mentioned above, the lower and upper side arms 36 and 44 are rotated by identical angles (for example, an angle corresponding to 1.5 slots) in opposite directions by a rotating device not shown in the drawing. During this process, center top portions of the connecting portions 64 of the outside wires 6A are always retained to the biasing disk plate 53 due to the contraction force urged by the biasing disk plate 53. Therefore, each of the connecting portions 64 is formed in a twisted shape by rotating the lower and upper side arms 36 and 44 by identical angles in opposite directions in such a manner that both sides of the connecting portio[008e] 64 are uniformly deformed centered on the top portion of the connecting portion 64.

Further, similarly to the first embodiment, as the height position of the connecting portion 64 becomes lower, the biasing disk plate 53 moves downward to follow the connecting portion 64 and continues to urge the connecting portion 64 with a certain biasing force. Therefore, the connecting portion 64 is twisted without the fluctuation of the twisted shape of the connecting portion 64.

The near letter U shaped double wires 60 project on sides of the connecting portions 63 and 64 out of the inside and outside holding portions 35 and 45, respectively. The respective double wires projecting on the sides of the connecting portions 63 and 64 have lengths to an extent that, when the inside and outside holding portions 35 and 45 are rotated relatively in opposite directions, only the respective projecting connecting portions 63 and 64 are deformed and the respective straight line portions 61 and 62 held in the inside and outside holding portions 35 and 45 are not drawn out substantially in directions of the connecting portions 63 and 64.

Further, even if the biasing disk plate 53 urges the connecting portion 64 of the outside wire 6A, the leading end of each straight portion 62 of the outside wire 6A is held at a predetermined position in an axial direction of each straight line portion 62 by the external or internal circumference step 32 or 42. Therefore, the each straight portion 62 can not move in an axial direction thereof, and the each straight portion 62 may not be further pushed into the inside or outside holding portion 35 or 45 by the biasing disk plate 53. Therefore, when the near letter U shaped double wires 60 are formed in the twisted shapes, the outside wire 6A may be prevented from a damage due to a friction between the each straight line portion 62 and the inside or outside holding portion 35 or 45.

On the other hand, when the inside wire 6B is inserted into the inside and outside jigs 3 and 4, the inside wire 6B is put between a lower surface of the connecting portion of the outside wire 6A and the spring type biasing means 7 and receives a force in a contraction direction therefrom.

However, as a curvature radius of the connecting portion of the inside wire 6B is smaller than that of the connecting portion 64 of the outside wire 6A, the inside wire 6B is hardened in a higher degree when the inside wire 6B is bent to form in the letter U shape. Therefore, at the twisting formation process, the twisting of the connecting portion 63 of the inside wire 6B starts at positions more far away from the center thereof, compared with the twisting of the connecting portion 64 of the outside wire 6A. As a result, after the twisting formation process, the length of the inside wire 6B becomes shorter than that of the outside wire 6A.

As mentioned above, the leading ends of the straight line portions 61, 61 of the inside wire 6B are urged toward the biasing disk plate 53 by the coil springs 73 and 74 via the movable external and internal tubes 71 and 72, respectively. Therefore, when the connecting portion 63 of the inside wire 6B is twisted, the movable external and internal tubes 71 and 72 move upward by a length corresponding to the shorter length resulted in the inside wire 6B. Thus, the upper surface of the connecting portion 63 of the inside wire 6B keeps to be pressed against the lower surface of the connecting portion 64 of the outside wire 6A. Therefore, as the inside wire 6B is also twisted at a state that an axial movement is restricted, no fluctuation of the twisted shape of the connecting portion 63 of the inside wire 6B may be generated.

As a plurality of the near letter U shaped double wires 60 are installed in the inside and outside jigs 3 and 4, all of the near letter U shaped double wires 60 are formed in twisted shapes at a time when the inside and outside jigs 3 and 4 are relatively rotated. That is, a large amount of the twisted double wires 6 as shown in FIG. 8 are manufactured at a time.

Further, after the twisted double wires 6 are inserted into the slots of the stator core, the leading ends of the straight portions 61 and 62 are further formed to bend. At this bending formation process, the respective layers of the straight line portions 61 and 62 of the twisted double wires 6 exposed out of the respective leading ends of the slots are twisted alternately in the adjacent layers in opposite circumferential directions by a predetermined angle (for example, angle corresponding to 1.5 slots). That is, first and third layers of the straight line portions 61 and 62 viewed from an internal diameter side of the stator core are twisted in one circumferential direction by the predetermined angle and second and fourth layers of the straight line portions 61 and 62 are twisted in the other circumferential direction (direction opposite to that of the first and third layers) by the predetermined angle (same angle with the first and third layers). After that, adjacent leading ends of the outside and inside wires 6A and 6B are respectively connected by welding and the like to complete the stator core.

When the leading ends of the outside and inside wires 6A and 6B are connected in a manner mentioned above, if the leading end positions of the outside and inside wires 6A and 6B are flatly aligned, the connecting work may be easily performed. Therefore, in view of the fact that the length of the inside wire 6B becomes shorter than that of the outside wire 6A at the twisting formation process, original length of the inside wire 6B is primarily set to be longer than that of the outside wire 6A, as shown in FIG. 4. Thus, at the connecting process, the respective leading ends of the outside and inside wires 6A and 6B may be at the flatly aligned positions.

Figure 9:
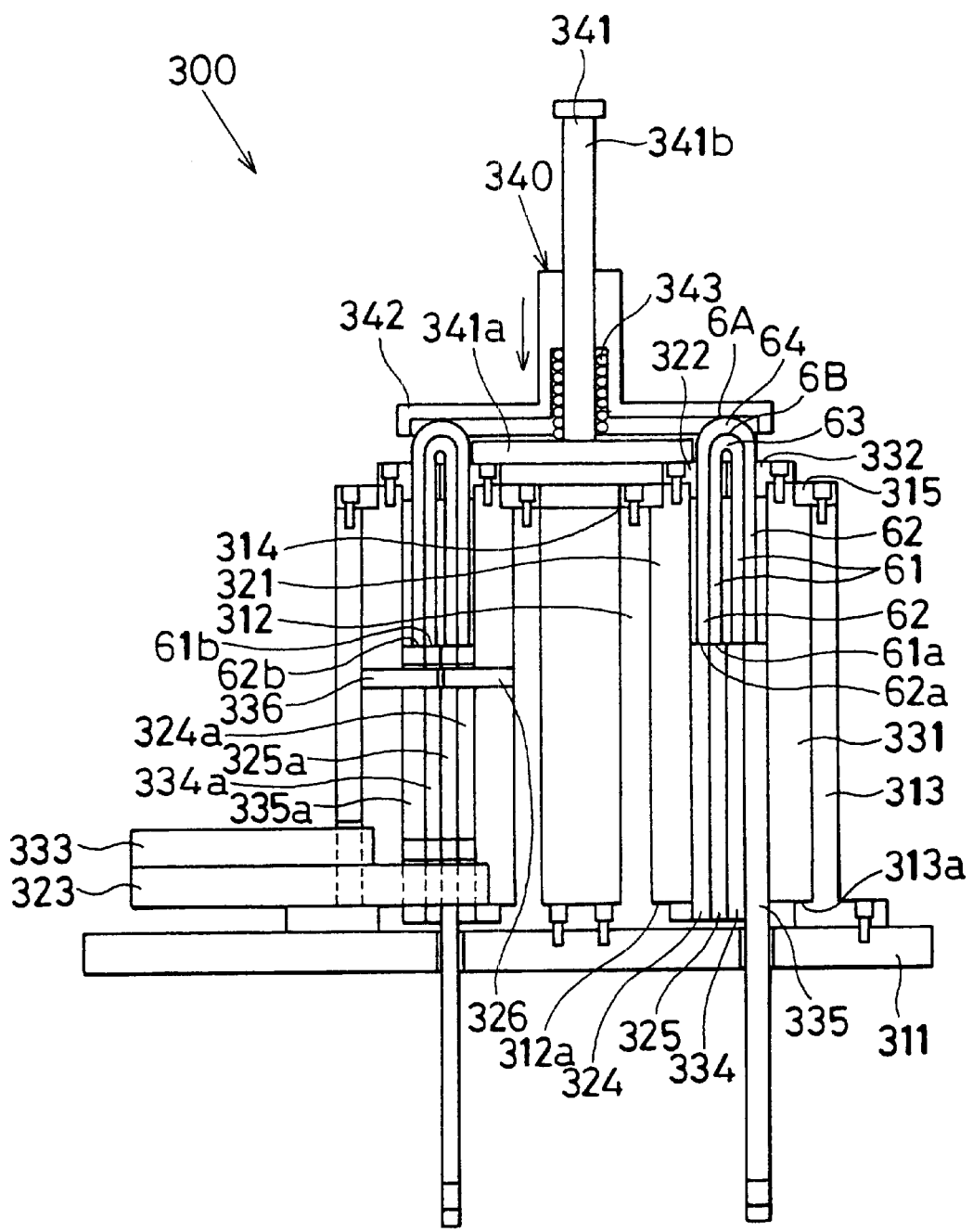
FIG. 9 is a cross sectional front view of a wire twisting formation apparatus according to a third embodiment of the present invention.
Figure 10:
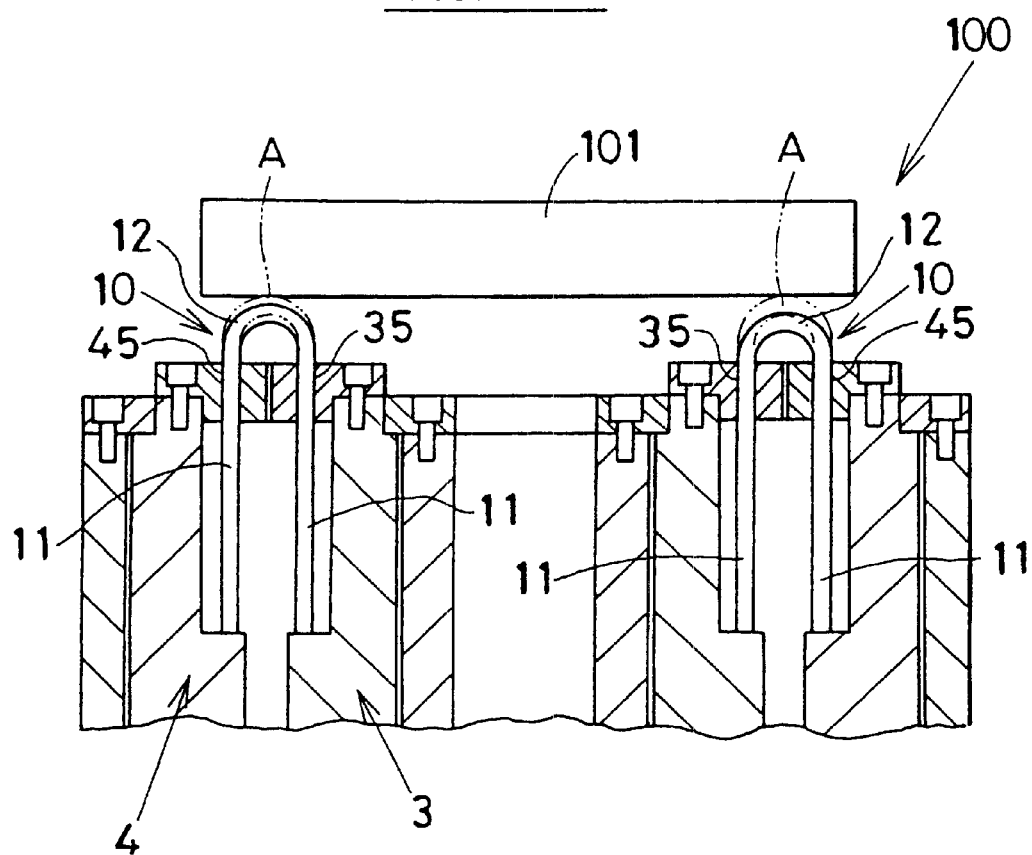
FIG. 10 is a partly enlarged view of a conventional apparatus for forming in a twisted shape a near letter U shaped wire.

FIG. 9 shows a twisting apparatus 300 as a further stator manufacturing apparatus according to a third embodiment of the present invention. The twisting apparatus 300 is composed of a base plate 311, an inside jig 321, an outside jig 331 and a coil biasing mechanism 340. A cylindrical shaped center axis tube 312 and a cylindrical shaped external tube 313 positioned concentrically and outside the center axis tube 312 are fixed perpendicularly to the base plate 311. The inside and outside jigs 321 and 331 are rotatably housed between the center axis tube 312 and the external tube 313.

On an outer lower side of the center axis tube 312 and on an inner lower side of the external tube 313, provided are step portions 312a and 313a for holding in an axial direction the inside and outside jigs 321 and 331, respectively. Further, at respective upper ends of the center axis and external tubes 312 and 313, fastened are inside and outside retaining rings 314 and 315 for restricting axial upward movement of the inside and outside jigs 321 and 331, respectively.

The inside jig 321 is provided at an upper end surface thereof with an inside holding ring 322. A lower side arm 323 for transmitting rotation torque to the inside jig 321 is connected at a lower portion of the inside jig 321. Adjacent to the inside jig 321, rotatably provided are cylindrical shaped first and second positioning rings 324 and 325 for positioning leading lower ends 62a and 61a of one of the outside and inside wires 6A and 6B, respectively. The first and second positioning rings 324 and 325 are connected through a pin 326 to the inside jig 321 and rotatable together with the inside jig 321. The first and second positioning rings 324 and 325 are connected through a penetrating hole provided in the base plate 311 to a drive motor (not shown in the drawing) and respectively independently movable in an axial direction (up and down directions in the drawing).

The first and second positioning rings 324 and 325 are provided with slits 324a and 325a extending in axial directions thereof. Circumferential width of the slit 324a or 325a is same with circumferential thickness of the pin 326 provided at an axially intermediate portion of the inside jig 321 and extending toward an outer diameter side thereof. An engagement of the pin 326 with the slits 324a and 325a enables to transmit the rotation force rendered to the inside jig 321 to the first and second positioning rings 324 and 325.

The axial lengths of the slits 324a and 325a is long to an extent that the pin 32 does not prevent a movement of the first and second positioning rings 324 and 325 for moving upward the near letter U shaped double wires 60 after finishing the twist formation thereof.

The outside jig 331 is composed of the similar structure to the inside jig 321. That is, the outside jig 331 is provided at an upper end surface thereof with an outside holding ring 332. An upper side arm 333 for transmitting rotation torque to the outside jig 331 is connected at a lower portion of the outside jig 331. Adjacent to the outside jig 331, rotatably provided are cylindrically shaped third and fourth positioning rings 334 and 335 for positioning leading lower ends 62b and 61b of the other of the outside and inside wires 6A and 6B, respectively.

The third and fourth positioning rings 334 and 335 are connected through a pin 336 to the outside jig 331 and rotatable together with the outside jig 331. The third and fourth positioning rings 334 and 335 are connected through a penetrating hole provided in the base plate 311 to the drive motor (not shown in the drawing) and respectively independently movable in an axial direction (up and down directions in the drawing). The third and fourth positioning rings 334 and 335 are also provided with slits 334a and 335a extending in axial directions thereof, as are same with the first and second positioning rings 324 and 325.

The coil biasing mechanism 340 is composed of an inside guide 341, a biasing disk plat[0085] 342, a spring 343 and a driving motor (not shown in the drawing). The inside guide 341 is for guiding an inside diameter portion of the outside wire 6A after the straight line portions 61 and 62 of the near letter U shaped double wires 60 are inserted into inside and outside holding portions formed in inside and outside holding rings 322 and 332 and, then, twisted.

The inside guide 341 is composed of a disk portion 341a having a diameter corresponding to the inside diameter of the near letter U shaped double wires 60 arranged in circle shapes, and a shaft 341b extending perpendicularly from a center of the disk portion 341a.

The biasing disk plate 342 is movable up and down along the shaft 341b by a drive motor (not shown in the drawing). The spring 343 is provided between the inside guide 341 and the biasing disk plate 342 and urges the inside guide 341 downward.

Next, a method for forming in twisted shapes the near letter U shaped double wires 60 with the stator manufacturing apparatus is described.

The respective straight line portions 61 and 62 of the near letter U shaped double wires 60 at a state that two pieces of the outside and inside wires 6A and 6B are in and out in pile are inserted into the inside and outside holding portions. Then, the drive motor (not shown) moves down the coil biasing mechanism 340.

Thus, the disk plate portion 341a of the inside guide 341 is inserted into the inside diameter portion of the near letter U shaped double wires 60 arranged in ring shapes. Then, the biasing disk plate 342 further moves down relative to the inside guide 341 so as to come in contact with the top portion of the connecting portion 64 of the outside wire 6A. On the other hand, the first to fourth positioning rings 324, 325, 334 and 335 move up by means of the drive motor (not shown) to support the lower ends of the near letter U shaped double wires 60, respectively.

Thus, the axial movements of the near letter U shaped double wires 60 are restricted by the biasing disk plate 342 and the first to fourth positioning rings 324, 325, 334 and 335. In particular, as the drive motor (not shown) controls the biasing disk plate 342 to keep pressing against the top portion of the outside wire 6A with a certain torque so that a predetermined contacting force may be applied to the outside wire 6A.

While the above state is maintained, the connecting portions 63, 64 of the outside and inside wires 6A and 6B are simultaneously twisted by the lower and upper arms 323 and 333 being rotated each other in opposite directions by the identical angles (for example, angle corresponding to 1.5 slots) by the rotation device (not shown in the drawing). At this twisting formation process, the first and fourth positioning rings 324 and 335 supporting the leading ends 62a and 62b of the outside wire 6A are held at predetermined axial positions.

Similarly to the second embodiment, as the height position of the connecting portion 64 becomes lower at the twisting formation, the biasing disk plate 342 moves more downward to follow the connecting portion 64, since the biasing disk plate 342 continues to press the connecting portion 64 with the certain torque. As a result, the connecting portion is twisted without the twisted shape fluctuation of the connecting portion 64.

On the other hand, a length of the inside wire 6B after the twisted formation becomes shorter than that of the outside wire 6A, as mentioned in the second embodiment. To cope with this matter, the driving motor (not shown) controls the second and third positioning rings 325 and 334 supporting the leading ends 61a and 61b of the straight portions 61 of the inside wire 6B to urge the leading ends 61a and 61b with a certain torque at the twisted formation process.

Thus, the second and third positioning rings 325 and 334 moves upward by a distance corresponding to the distance by which the inside wire 6B becomes shorter when the connecting portion 63 thereof is twisted. Therefore, as the upper surface of the connecting portion 63 of the inside wire 6B keeps in pressing contact with the lower surface of the connecting portion 64 of the outside wire 6A. As a result, no twisted shape fluctuations of the connecting portions 63 of the inside wires 6B may generate, as the inside wires 6B are also twisted under the axial movement restriction.

Then, after the near letter U shaped double wires 60 are formed in twisted shapes by the inside and outside jigs 321 and 331, the first and fourth positioning rings 324 and 335 supporting the leading ends 62*a* and 62*b* of the outside wire 6A move upward with a predetermined torque or by a predetermined distance, while the biasing disk plate 342 urges the connecting portion 64 of the outside wire 6A.

Through this process, the fluctuation of the leading end positions of the outside wires 6A, which may have occurred to some extent before the upward movement, may be absorbed so that the leading ends of the outside wires 6A may be accurately aligned.

In addition, though it serves effectively to align the leading end positions of the outside wires 6A that the biasing disk plate 342 urges the outside wire 6A with the predetermined torque, there may be a case that the positions of the leading ends 62*a* and 62*b* are not neatly aligned, in particular, when a frictional force between the straight portion 62 and the holding portion for folding the straight portion 62 is large. To this end, the upward movement of the first and fourth positioning rings 324 and 335 supporting the leading ends 62*a* and 62*b* causes to align definitely the leading end positions. As a result, the connecting process coming thereafter that the leading ends of the outside and inside wires 6A and 6B are connected by welding and the like becomes easier. As other functions and results are similar to those described in the second embodiment, the explanation is omitted.

Though the above first to third embodiments describe that the connecting portions of the near letter U shaped wires are twisted by rotating the inside and outside jigs in the opposite directions by the same angle, rotating only one of the outside and inside jigs or rotating the jigs in the opposite directions by rotating angles different from each other may be an alternative way. In other words, it may be sufficient to relatively rotate the both jigs so as to the connecting portion of the near letter u shaped wire. However, in case of rotating only one of the jigs, it is necessary to make the biasing disk plate for urging with the predetermined torque the connecting portions of the near letter U shaped wires rotatable. When the one of the jigs is rotated, rotating the biasing disk plate by an angle corresponding to ½ rotation angle of the jig makes it possible to twist uniformly both sides of the connecting portion.

Further, according to the second and third embodiments, the twisting formation process is described as the case of piling up doubly the outside and inside wires 6A and 6B. In place of th[0085] doubl[0085] wires, i[009f] may be possible to form in twisted shapes the near letter U shaped wires piled up triply and more.

Furthermore, the above embodiments describe the case that the stator coil is made by connecting the rectangular cross sectional wires. However, the cross section thereof is not limited to be of the rectangular shape but may be of circular, oval or polygonal shape other than the rectangular shape.

What is claimed is:

1. A method of manufacturing a stator having a plurality of twisted wires connected to each other, each of the twisted wires being formed of a letter U shaped wire having one straight line portion, another straight line portion in parallel to the one straight portion and a turning portion bridging between respective longitudinal ends of said one and another straight line portions, through a process comprising steps of:

positioning said one and another straight line portions on outside and inside concentric circles perpendicularly thereto, respectively, so as to be aligned radially from an axis of said concentric circles;

holding respective given longitudinal lengths of said one and another straight line portions slidably in a longitudinal direction thereof and forcing the respective given longitudinal lengths of said one and another straight line portions to rotate relatively in reverse along said concentric circles so that a distance between said one and another straight line portions is increased and said turning portion is twisted; and simultaneously when said turning portion is twisted, urging continuously a biasing force acting in longitudinal directions of said one and another straight line portions against at least one of a center of said turning portion and both the other longitudinal ends of said one and another straight line portions so that the other one of said center of said turning portion and said both the other longitudinal ends of said one and another straight line portions receives a reaction force of the biasing force.

2. A method according to claim 1, further comprising steps of:

arranging in a ring shape a plurality of said letter U shaped wires on said concentric circles at circumferential intervals, wherein all pairs of said one and another straight portions are moved relatively and circumferentially at the same time so as to be more apart from each other so that all of turning portions of the letter U shaped wires are simultaneously twisted.

3. A method of manufacturing a stator having a plurality of twisted wires connected to each other, the twisted wires being formed of a first group of letter U shaped wires each having a pair of a first group of straight line portions in parallel to each other and a first group of turning portions bridging between respective longitudinal ends of said first group of straight line portions and a second group of letter U shaped wires each having a pair of a second group of straight line portions in parallel to each other and a second group of turning portions, whose radius of curvature is smaller than that of the first group of turning portions, bridging between respective longitudinal ends of said second group of straight line portions, through a process comprising steps of:

positioning said first group of straight line portions on and most inside concentric circles and said second group of straight line portions on middle outside and middle inside concentric circles perpendicularly thereto, respectively, so as to be aligned radially from an axis of said most outside, middle outside, middle inside and most inside concentric circles so as to pile up said first group of letter U shaped wire on said second group of letter U shaped wire;

holding given longitudinal lengths of respective pairs of said first and second groups of straight line portions slidably in a longitudinal direction thereof and forcing the given longitudinal lengths of respective pairs of said first and second groups of straight line portions to rotate relatively in reverse along said most outside and inside concentric circles and along said middle outside and inside circles, respectively, so that each distance between respective pairs of said first and second groups of straight line portions is increased and each of said first and second groups of turning portions is twisted; and simultaneously when said first and second group of turning portions are twisted, urging continuously a biasing force acting in longitudinal directions of said first group of straight line portions against a center of said first group of turning portions so that both the other longitudinal ends of said first group of straight line portions receive reaction force of the biasing force.

4. A method according to claim 3, wherein said both the other longitudinal ends of said first group of straight line portions are supported so that said first group of straight line portions do not move in the longitudinal directions thereof, when the biasing force is urged against the center of said first group of turning portions.

5. A method according to claim 3, further comprising steps of:

urging a biasing force acting in the longitudinal directions of said second group of straight line portions against respective the other longitudinal ends of said second group of straight line portions, so that said centers of said first and second groups of turning portions are always in contact with each other, when said second group of turning portion is twisted.

6. A method according to any one of claims 3 to 5, further comprising steps of:

urging a biasing force acting in the longitudinal directions of said first group of straight line portions against respective the other longitudinal ends of said first group of straight line portions, after said first and second groups of turning portions have been twisted, so that all of the other longitudinal ends of said first and second groups of straight line portions are aligned substantially in a line.

7. A method according to any one of claims 3 to 5, further comprising steps of:

arranging in a double ring shape a plurality of said pairs of said first and second group of letter U shaped wires on said most outside, middle outside, middle inside and most inside concentric circles at circumferential intervals, respectively, wherein all of said pairs of said first and second groups of straight line portions are moved relatively and circumferentially simultaneously so as to be further away from each other, respectively, so that all of said turning portions of said first and second group of letter U shaped wires are simultaneously twisted.

* * * * *